Dec. 14, 1948.　　　　　　A. WOLF　　　　　　2,456,233
LIQUID LEVEL MEASUREMENT AND CONTROL
Filed Aug. 26, 1944
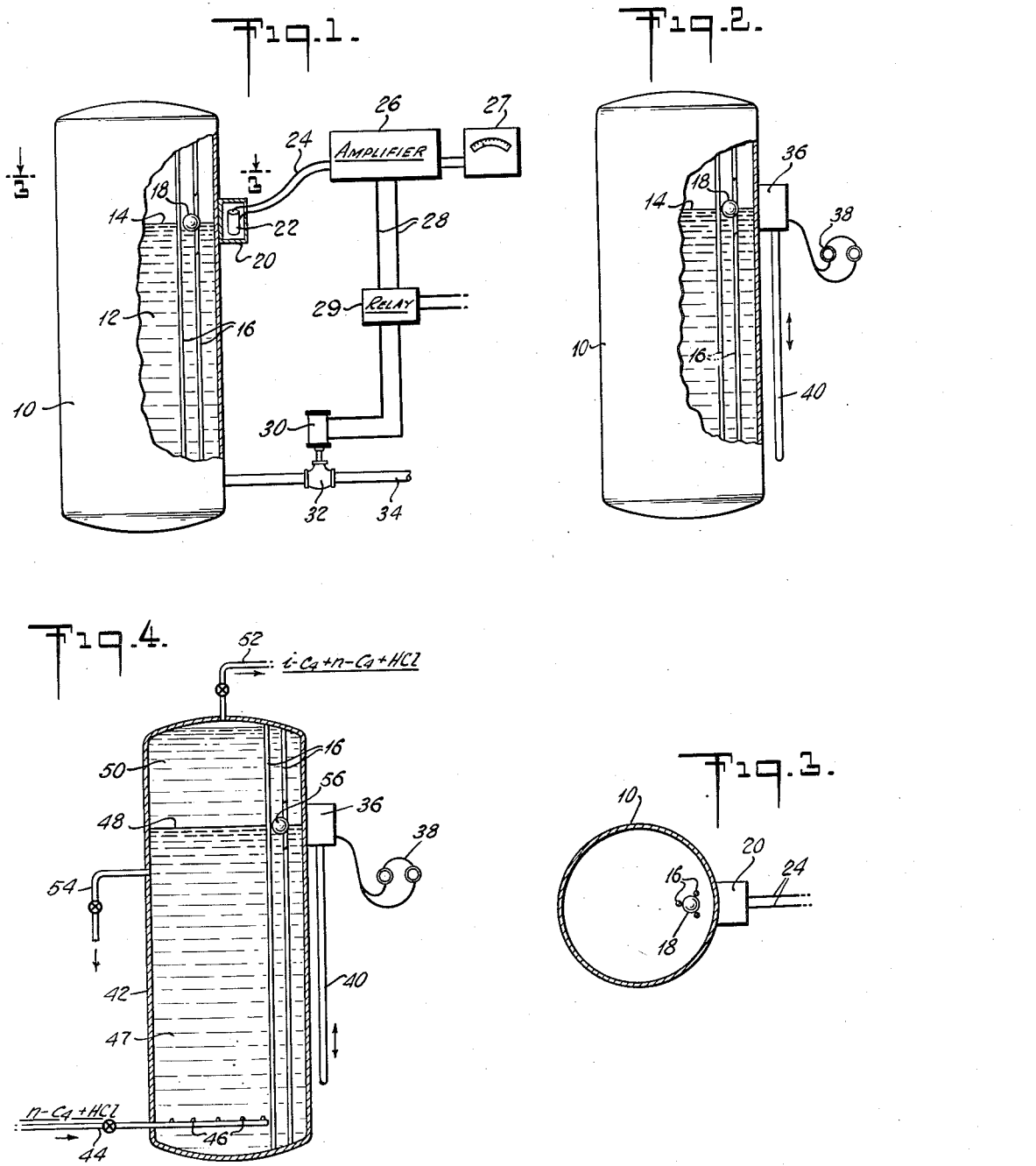
INVENTOR
ALEXANDER WOLF.
BY
ATTORNEY Patented Dec. 14, 1948

2,456,233

UNITED STATES PATENT OFFICE 2,456,233

LIQUID LEVEL MEASUREMENT AND CONTROL

Alexander Wolf, Houston, Tex., assignor to The Texas Company, New York, N. Y., a corporation of Delaware Application August 26, 1944, Serial No. 551,369

19 Claims. (Cl. 250—83)

This invention relates to liquid level measurement and control and more particularly to a method and an apparatus through the use of which the liquid level in a vessel or container can be ascertained or maintained at a desired height without the use of gauge glasses, float systems or other devices requiring openings or packed shafts extending through the wall of the container.

In many instances, gauge glasses are not suitable as indicators of liquid level because of the formation of coke or scale within the glass and its connecting pipes and in many operations, particularly in the petroleum refining industry, the pressures of the liquids to be measured are too high to permit the use of gauge glasses. Again, there are many instances where it is desired to measure or maintain at a certain height the interface between two immiscible liquids of different gravities—this is especially true where the liquids are more or less colorless in appearance, and obviously gauge glasses are not satisfactory for this use. For the same reasons, the use of float systems in which a shaft attached to a float within the container passes through the wall of the container to an indicating device at the outer side is also impractical since, where high pressures are involved, it is usually impossible to pack the shaft tightly enough to prevent leakage without incurring so much friction that the indicator will not show accurately small changes in the liquid level.

In the U. S. Letters Patent, No. 2,348,810, granted to D. G. C. Hare May 16, 1944, an apparatus and a method are described whereby it is possible to measure liquid level from the outer side of an opaque container without the necessity for access to the interior thereof. That patent discloses the use of penetrative radiation, such as gamma rays, which are caused to pass into the interior of the vessel wherein some of the radiation is scattered and returned back to a radiation detector disposed near the source and at the same side of the vessel wall as the source. The amount of the detected radiation will depend upon whether or not the level of the liquid in the container is above or below the radiation source and the measuring instrument.

In the U. S. Letters Patent No. 2,323,128, granted to D. G. C. Hare June 29, 1943, a somewhat similar arrangement is disclosed in which part of the radiation from a source is scattered within the container back to a detector disposed near the source while some of the radiation passes through the vessel to its opposite side where it is detected by means of another radiation detector. The response of two detectors will vary inversely, and a circuit is disclosed for simultaneously measuring the outputs of the detectors.

While the methods disclosed in the two Hare patents described in the preceding paragraphs are generally satisfactory, there are times when their use might be considered impractical. Where the scattering method shown in the Patent 2,348,-810 is used in the measuring of liquid level in a vessel having relatively thick walls, a fairly large radiation source must be used in order that the rays will penetrate through the wall into the interior and then back again through the wall to the exterior. The same is true in connection with the method disclosed in the other Hare Patent 2,323,128 since where the vessel or container has a diameter of several feet, it is, of course, necessary to use sufficient radium or other radioactive material so that the rays will first pass through the wall of the container, then through the interior of the container and through the opposite wall to the detector.

In accordance with the present invention, a method and an apparatus are provided by means of which the level of liquid in an opaque container can be determined quickly from the outside of the container by using a very small quantity of radioactive material such as, for instance, one-fifth of a milligram of radium. This method is useful regardless of the diameter of the vessel, and even in instances where the wall of the vessel is quite thick (such as two or three inches) it is still not necessary to increase the amount of radium to more than a few milligrams.

In carrying out the invention, a source of radiation, such as a small quantity of radium, is placed within a float member, such as a hollow ball, which is caused to float upon the liquid within the container. Guide rods or other means are provided to confine the movement of the float to a vertical path parallel to the side wall of the container and disposed a few inches therefrom. A radiation detector then can be moved vertically along the outer surface of the container parallel to the path of the float and, by connecting the detector to a suitable amplifier and indicating device, the latter will respond to the output of the detector which in turn is responsive to the intensity of the radiation transmitted from the float outwardly through the wall of the container. The intensity of the response, of course, will vary with the distance between the source and the detector and when the indicating device shows a maximum response it will be known that the detector at that instant is horizontally opposite the float and that that point represents the height or level of the liquid in the container. If desired, a detector can be mounted in fixed position at or near the outer surface of the container at a height at which it is desired to maintain the liquid level, and as the float in its movement approaches the level of the detector, the detector output, and thus the indicator response, will increase and a valve in an intake or outlet line from the container can be actuated automatically in accordance with the response of the detector; in this manner the liquid level can be maintained substantially at a desired point.

In an application of Gerhard Herzog filed concurrently herewith, Serial No. 551,368, an electrical circuit is described by means of which the output of a radiation detector is indicated as an audible tone emitted either from a loud speaker or a pair of headphones. The tone volume or loudness varies directly with the intensity of the detected radiation and provides an effective indicating means. It is contemplated that, in connection with the present invention, the radiation detecting and audible indicating circuit of Serial No. 551,368 can be used for locating the position of the float within the container.

The invention also contemplates the determination and control of the level of the interface between two immiscible liquids of different densities, such as the complex and the liquid hydrocarbons, in a reactor or tower, such as may be used in the isomerization of hydrocarbons by contact with a liquid isomerization catalyst. In such a case, the float containing the source of radiation is designed so that it will sink in the upper, lighter liquid, such as the liquid hydrocarbons, but will float upon the complex or catalyst. The float, therefore, will follow the upward and downward movements of the interface, and determination or control of the level of the interface can be effected, as has been described in the preceding paragraphs. The invention obviously also has application in processes of petroleum alkylation and in numerous chemical manufacturing and treating processes.

For a better understanding of the invention reference may be had to the accompanying drawing in which:

Figure 1 is an elevation, partly in section of an installation showing the control of liquid level in a container;

Figure 2 is a view similar to Figure 1 but showing a modified form of indicating instrument;

Figure 3 is a section taken on line 3—3 of Figure 1; and

Figure 4 is a somewhat diagrammatic elevation of an isomerization tower showing application of the invention to the determination of the liquid interface therein.

Referring to the drawing and particularly to Figure 1 thereof, a vessel or container 10 is shown as holding a quantity of a liquid 12, the level of which is indicated at 14. It is assumed that the container 10 is opaque so that there is no way of visually determining the height of the surface 14 of the liquid. Disposed within the container 10 is a guide device shown as comprising three rod-like elements 16 arranged in triangular formation as is indicated in Figure 3 and extending from top to bottom of the container parallel to and separated slightly from one of the side walls of the container. Within the rods 16 is a float member shown as a semi-hollow ball 18, this float member containing a small quantity of a radioactive material such as radium capable of emitting penetrative radiation, such as gamma rays, some of which passes outwardly of the container 10 through the side wall thereof. The member 18 floats upon the liquid 12 and the rods 16 confine its movement to a vertical path parallel to the side wall of the container. It is to be understood that, in case the container 10 is of considerable height and the normal variation of the liquid level is only a relatively small distance, the guide rods 16 need not extend from the top to the bottom of the container but only for a distance sufficient to cover the variations in the liquid level. It is also to be understood that a perforated pipe or tube slightly larger in internal diameter than the external diameter of the ball 18, can be used as guide means instead of the rods 16. Likewise one or more wires passing through holes in the float can be used to guide the ball float in the desired direction.

Disposed adjacent or near the outer surface of the side wall of the container 10 and at a height corresponding to the desired liquid level is a housing 20 containing a detector of radiation 22 which may be of any suitable type, such as a Geiger-Mueller counter or an ionization chamber. The detector 22 is shown as connected by means of wires 24 to an amplifier 26, the output of which is connected to a meter 27 and by wires 28 to a suitable relay 29 and a valve-actuating device, such as the solenoid 30. The solenoid 30 is preferably biased toward one position and is adapted to close or open a valve 32 connected in a pipe 34 which may comprise either an inlet or an outlet from the vessel 10.

Assuming that the liquid level 14 is below that shown in the drawing, radiation from the source in the float 18 passing outwardly through the wall of the vessel may be detected by the device 22, but the intensity of the detected radiation when amplified by the device 26 will not be sufficiently great to cause actuation of the solenoid 30. Assuming that the valve 32 is biased to its open position, make-up liquid can be passed through the pipe 34 into the vessel or container. The liquid level will rise, shortening the distance between the float 18 and the detector 22. When the float is substantially opposite the detector, the intensity of the radiation detected will be sufficient to trip the relay 29 and cause the solenoid 30 to close the valve 32. By proper design of the amplifier and the solenoid, the arrangement illustrated will automatically maintain the liquid level 14 substantially at the height of the detector 22. The illustration in Figure 1 is somewhat diagrammatic and it is to be understood that other suitable forms of valve actuation may be used and also that a suitable preamplifier may be connected to the detector 22 and disposed if desired within the housing 20.

If it is desired merely to have an indication of the level of the liquid in the container 10, the solenoid 30 can be dispensed with and the meter 27 will indicate the intensity of the radiation picked up by the detector 22, and thus the approximate height of the float 18. A maximum reading on the meter 27 will indicate that the float 18, and thus the liquid level 14, is substantially horizontally opposite the detector.

In Fig. 2 a simplified form of indicating device is disclosed by means of which the level of the liquid within the container can be determined accurately at any time. A housing 36 contains a radiation detector similar to the detector 22 and an associated electrical circuit, the output of which is connected to a pair of headphones 38. The housing 36 is secured to the end of a rod or pole 40, which may be extensible, and by means of which an operator wearing the headphones 38 can push the instrument vertically along the side of the container parallel to the path of the float 18 within the container. The circuit within the housing 36 is designed such that, when the detector approaches within a predetermined distance of, say, one foot from the float 18, a tone will be heard in the headphones 38. The volume or loudness of this tone rises inversely as the distance between the float and the detector so that the tone will have its maximum volume when the detector is horizontally opposite the float. By observing the volume of the tone in the headphones, the operator can determine quickly the position of the float 18, and thus the liquid level 14, within the container and can, if he desires, place a mark on the outside of the container or record the height in any desired manner. For a detailed description of the detector circuit utilized in the instrument 36, reference is directed to the aforementioned application of Gerhard Herzog, Serial No. 551,368, filed concurrently herewith.

As has been mentioned hereinbefore, one application of this invention is in the process of isomerizing hydrocarbons by contacting liquid isomerization catalyst in a reaction tower wherein the hydrocarbons undergoing isomerization rise in liquid phase through a column of the liquid catalyst and in so doing form a body of liquid hydrocarbons floating on the surface of the liquid catalyst. It is desirable to know the height of the interface between the catalyst and the liquid hydrocarbons in the reaction tower. In Figure 4 a reactor or reaction tower 42 is illustrated somewhat diagrammatically, the tower having an inlet 44 for the hydrocarbon, such as normal butane, and the liquid catalyst. This catalyst may be an aluminum halide-hydrocarbon complex, advantageously containing a small amount of free or uncombined aluminum halide. Aluminum chloride and aluminum bromide are examples of suitable metallic halides. These catalyst are usually employed with a hydrogen halide promoter, such as hydrogen chloride. The normal butane, catalyst and promoter pass into the tower 42 through the inlet 44 and then are directed upwardly by means of the jets 46. The catalyst or complex 47 is shown in the tower below the interface 48 separating the catalyst from the hydrocarbons 50 which float on top of the catalyst. The isobutane, together with some of the normal butane and some of the promoter, is drawn off from the top of the tower through the outlet 52, and some of the complex, if desired, may be drawn off through the off-take 54.

A plurality of guide rods 16 are disposed within the tower as has already been described with respect to the container 10 in Figure 1, and between these guide rods floating at the interface 48 is a semi-hollow ball 56 containing a small amount of a radioactive substance, not shown. The float member 56 preferably is formed as a hollow sphere of a corrosion-resistant metal, such as Hastelloy, and the ball is carefully designed so that it will sink to the bottom of the hydrocarbon layer 50 but will float upon the denser complex 47. In order to determine the height of the interface 48 from the outside of the tower 42, the device shown in Figure 2 can be used, this device comprising the instrument 36 which includes a radiation detector and an associated circuit having its output connected to the headphones 38, this circuit being disclosed in the aforementioned Herzog application Serial No. 551,368. As has already been described, a rod or pole 40 can be used to raise the instrument 36 along the outer surface of the tower and the operator wearing the headphones 38 can determine from the volume or amplitude of the tone, which he hears, the location, or rather the height, of the float 56 and thus the interface 48.

Other indicating means than that shown in Figure 4, of course, can be used. A radiation detector disposed within the housing 36 can be connected to a suitable amplifier and meter, such as is shown in Figure 1, in which case the deviation of the meter needle can be used to indicate when the detector and the float are horizontally opposite. Also, it is to be understood that the output of the radiation detector can be used to control a suitable valve either in the inlet 44, the outlet 52 or the draw-off 54 in the manner described with reference to Figure 1.

Instead of using a single radiation detector, two such detectors can be placed in a fixed position against or near the outer surface of the side wall of the vessel 10 or the tower 42, the two detectors being slightly separated in a vertical direction and disposed at a height corresponding substantially with the desired liquid level in the vessel. As the level, and thus the float containing the radioactive substance, approaches one of the detectors and thus moves away from the other detector, the variation in the outputs of the two detectors can be caused to operate a valve or valves so as to vary or maintain the level of the liquid. With such an arrangement "hunting" of the control system can be minimized.

It is also contemplated that where two or more immiscible liquids of different densities are in one container, more than one float may be used, i. e. one at the interface between adjacent bodies of liquid and one for the top of the uppermost liquid. The height of any one or all of the floats can be determined in the manner which has been described.

The method which has been described for locating a float within a vessel, the float containing a source of penetrative radiation, will have still other applications than those already mentioned. For instance, where the density of a liquid in a vessel varies materially from time to time several floats can be used, each containing a source of radiation and the floats differing slightly from each other in their buoyancy characteristics. Thus, the floats can be designed so that they have progressively increasing weights and one or more of them will float on the surface of the liquid depending upon the liquid density. Each float would be confined to its own vertical path by means of wires, guide rods or the like, and by means of the method previously described the position of one or all of the floats in the vessel can be determined, thus providing an indication as to the density of the liquid.

In still another form, both the source of radiation and the detector could remain fixed, one at one side and the other at the other side of the vessel or the radiation source disposed in fixed relation within the vessel and the detector mounted substantially horizontally opposite at the outer surface of the vessel, and the variation in detector output as the liquid level rises above or falls below the position of the source and detector could be used to operate a recorder, a warning device, or a level control mechanism.

Obviously many modifications and variations of the invention, as hereinbefore set forth, may be made without departing from the spirit and scope thereof, and therefore only such limitations should be imposed as are indicated in the appended claims.

I claim:

1. A device for determining the level of a liquid in a container having a vertical wall comprising a member adapted to float upon said liquid, means for guiding movement of said float member to a substantially vertical path, a source of penetrative radiation within said float, a radiation detector adapted to be moved substantially vertically along the outer surface of said wall, and means responsive to the output of said detecting means for indicating when said float member is substantially opposite said detecting means.

2. A device for determining the level of a liquid in a container having a vertical wall comprising a member adapted to float upon said liquid, a source of penetrative radiation within said float, means for guiding movement of said float to a predetermined, substantially vertical path, radiation detecting means positioned near the outer surface of said wall and at a predetermined distance with respect to the desired liquid level height, and means responsive to the output of said detecting means for indicating when said float member is opposite said detecting means.

3. A device for determining the level of a liquid in a container comprising a member adapted to float upon said liquid, a source of penetrative radiation within said float, means for guiding movement of said float to a substantially vertical path parallel to a side wall of the container, radiation detecting means positioned near the outer surface of said wall and opposite the point of desired liquid level, and means responsive to the output of said detecting means for indicating when said float member is opposite said detecting means.

4. A device for determining the level of a liquid in a container having vertical side walls comprising a source of penetrative radiation within said container, a housing for said source adapted to float upon said liquid, guide means for confining movement of said housing to a vertical path parallel to one side wall of the container, a radiation detector adapted to be moved vertically along the surface of said container side wall, and means connected to said detector for indicating when said housing and source are opposite said detector.

5. A device for determining the level of a liquid in a container having at least one vertical side wall comprising a source of penetrative radiation within said container, a housing for said source adapted to float upon said liquid, guide means for confining movement of said housing to a vertical path parallel to said side wall of the container, a radiation detector disposed outside and near said container side wall and maintained at a height where it is desired to maintain said liquid level, and means connected to said detector for indicating when said housing and source are opposite said detector.

6. A device for determining the level of the interface between two immiscible liquids of different densities in a container having vertical side walls comprising a source of penetrative radiation within said container, a housing for said source adapted to float at said interface upon the heavier liquid, guide means for confining movement of said housing to a vertical path parallel to one side wall of said container, a radiation detector adapted to be moved vertically along the outside surface of the side wall of the container, and means responsive to the output of said detector for indicating when said housing and source, and thus said interface, are opposite said detector.

7. A device for controlling the level of a liquid in a container having an intake and a valve in said intake, comprising a member adapted to float upon the liquid in the container, means for guiding movement of said float member to a substantially vertical path, a source of penetrative radiation within said float, a radiation detector disposed near the outer surface of a side wall of the container at a height corresponding to the desired liquid level and responsive to the intensity of said transmitted radiation, actuating means for said valve, and means responsive to the output of said detector for energizing said valve-actuating means so as to maintain the liquid level at a point such that the intensity of the detected radiation will be a maximum.

8. The method of determining the level of a liquid in a container which comprises floating a source of penetrative radiation on said liquid, while confining movement of said source to a vertical path measuring the intensity of radiation transmitted from said source outwardly through a side wall of the container parallel to said vertical path, and noting the height at which the greatest intensity of transmitted radiation is indicated, said height corresponding to the liquid level within the container.

9. The method of determining the level of a liquid in a container which comprisees floating a source of penetrative radiation on said liquid while guiding the movement of the source to a vertical path, placing a radiation detector near the outer surface of the container at a height corresponding to the desired liquid level and determining from the intensity of the radiation detected when the radiation source is horizontally opposite said detector.

10. The method of controlling the level of a liquid in a container having an intake which comprises floating a source of penetrative radiation on said liquid while guiding the movement of the source to a vertical path, placing a radiation detector near the outer surface of the container at a height corresponding to the desired liquid level, measuring the intensity of the radiation detected and adjusting the inflow of liquid to said container in accordance with said measured radiation intensity.

11. The method of determining the level of the interface between two immiscible liquids of different densities in a container which comprises floating a source of penetrative radiation on the heavier of said liquids so that it will follow vertical movements of said interface while being confined to a vertical path, measuring the intensity of radiation transmitted from said source outwardly through a side wall of the container along a line parallel to said vertical path, and noting the height at which the greatest intensity of transmitted radiation is indicated, said height corresponding to the level of said interface in the container.

12. The method of controlling the level of the interface between two immiscible liquids of different densities in a container which comprises floating a source of penetrative radiation on the heavier of said liquids so that it will follow vertical movements of said interface while being confined to a vertical path, measuring the intensity of radiation transmitted from said source outwardly through a side wall of the container to a point the height of which corresponds with the desired interface level and controlling the amount of one of said liquids so as to maintain said measured intensity at a maximum.

13. In a process for isomerizing hydrocarbons by contact with a liquid isomerization catalyst in a reaction tower wherein the hydrocarbons undergoing isomerization rise in liquid phase through a column of said liquid catalyst and form a body of liquid hydrocarbons floating on the surface of said catalyst column, the method of determining the level of the interface between the catalyst and the liquid hydrocarbons which comprises floating a source of penetrative radiation on the catalyst at said interface while confining movement of said source to a vertical path, measuring the intensity of radiation transmitted from said source outwardly through a side wall of said tower along a line parallel to said vertical path and noting the height at which the greatest intensity is indicated, said height corresponding to the level of said interface within the reaction tower.

14. In a process for isomerizing hydrocarbons by contact with a liquid isomerization catalyst in a reaction tower wherein the hydrocarbons undergoing isomerization rise in liquid phase through a column of said liquid catalyst and form a hydrocarbon layer floating on the surface of said catalyst column, the method of determining the level of the interface between the catalyst phase and the hydrocarbon phase which comprises floating a source of penetrative radiation on the catalyst at said interface while confining movement of said source to a vertical path, measuring at a point near the outer surface of the tower and at a height corresponding to the desired level of the interface the radiation transmitted outwardly from said source, and determining from the intensity of the measured radiation when said source, and thus the interface, are horizontally opposite said point.

15. In a process for isomerizing hydrocarbons by contact with a liquid isomerization catalyst in a reaction tower wherein the hydrocarbons undergoing isomerization rise in liquid phase through a column of said liquid catalyst and form a body of liquid hydrocarbons floating on the surface of said catalyst column, the method of maintaining the level of the interface between the catalyst and the liquid hydrocarbons at a predetermined height which comprises floating a source of penetrative radiation on the catalyst at said interface while confining movement of said source to a vertical path, whereby radiation is transmitted outwardly through the side wall of said tower, detecting at a point near the outer surface of said tower and at a height corresponding to the desired height of the interface the amount of radiation transmitted to said point, and controlling the input of the hydrocarbons to be isomerized in accordance with the intensity of the detected radiation so as to maintain said radiation source, and thus said interface, at a height such that said intensity is at the maximum.

16. A device for determining the level of a liquid in a container comprising a member adapted to float upon said liquid, a source of penetrative radiation within said float member, means for confining movement of said float member to a predetermined substantially vertical path, radiation detecting means disposed outside said container and subject to radiation from said source, the response of said detecting means varying with the distance between the detecting means and the source, and means responsive to the output of said detecting means for indicating said distance, and thus the position of the liquid level in the container.

17. A device for determining the level of a liquid in a container comprising a member adapted to float upon said liquid, a source of penetrative radiation within said float, means for guiding movement of said float to a predetermined substantially vertical path, radiation detecting means positioned near the outer surface of said container in fixed position with respect to said vertical path, and means responsive to the output of said detecting means and thus to the distance between the detecting means and the float for indicating the height of the float and thereby the liquid level in the container.

18. A device for determining the level of a liquid in a container comprising a member adapted to float upon said liquid, a source of penetrative radiation within said float, means for guiding movement of said float to a predetermined substantially vertical path, radiation detecting means positioned near the outer surface of said container in predetermined position with respect to said vertical path, the response of said detecting means varying with the distance between the float and the detecting means, and recording means connected to receive the output of said detecting means for indicating said distance and thus the height of the liquid level in the container.

19. A device for controlling the level of a liquid in a container having a liquid flow line connected thereto and a valve in said flow line comprising a member adapted to float upon said liquid, a source of penetrative radiation within said float member, means for guiding movement of said float member to a predetermined substantially vertical path, radiation detecting means positioned near the outer surface of said container in fixed position with respect to said vertical path, the response of said detecting means varying with the distance between the float and the detecting means, actuating means for said valve, and means responsive to a predetermined output of said detecting means for energizing said valve actuating means to control the flow through said flow line to maintain the liquid level at a desired height in the container.

ALEXANDER WOLF.

REFERENCES CITED

The following references are of record in the file of this patent:

UNITED STATES PATENTS

| Number | Name | Date |
| --- | --- | --- |
| 2,315,819 | Schlesman | Apr. 6, 1943 |
| 2,323,128 | Hare | June 29, 1943 |
| 2,346,486 | Hare | Apr. 11, 1944 |
| 2,348,810 | Hare | May 16, 1944 |
| 2,349,429 | Herzog | May 23, 1944 |
| 2,401,723 | Deming | June 11, 1946 |